(12) United States Patent
Seuge (10) Patent No.: US 11,430,591 B2
(45) Date of Patent: Aug. 30, 2022

(54) SOLENOID VALVE LOCK

(71) Applicant: Carrier Corporation, Palm Beach Gardens, FL (US)

(72) Inventor: Nicolas Seuge, Rouen (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 62 days.

(21) Appl. No.: 16/861,923

(22) Filed: Apr. 29, 2020

(65) Prior Publication Data
US 2020/0357553 A1    Nov. 12, 2020

(30) Foreign Application Priority Data

May 9, 2019 (EP) ..................... 19305588

(51) Int. Cl.
*F16K 31/06* (2006.01)
*H01F 7/124* (2006.01)

(52) U.S. Cl.
CPC ......... *H01F 7/124* (2013.01); *F16K 31/0644* (2013.01)

(58) Field of Classification Search
CPC ............. F16K 31/0644; F16K 31/0675; F16K 27/029; H01F 7/124; H01F 7/127; H01F 7/081; H01F 7/1607; F16B 21/18
See application file for complete search history.

(56) References Cited

U.S. PATENT DOCUMENTS 3,281,740 A    10/1966 Riefler
4,055,823 A *  10/1977 Andersen ............ H01F 7/1607
                                                335/255
4,326,696 A *   4/1982 Ishikawa ............ F16K 31/0606
                                                137/625.65
5,421,474 A *   6/1995 Ramillon ................ F16B 21/18
                                                137/584
5,895,026 A     4/1999 Linkner, Jr.
6,459,348 B1   10/2002 Birkelund
(Continued)

FOREIGN PATENT DOCUMENTS

CN    202067622 U    12/2011
CN    105179775 A    12/2015
(Continued)

OTHER PUBLICATIONS

European Search Report for application 19305588.6, dated Nov. 12, 2019 , 8 pages.

*Primary Examiner* — Matthew W Jellett
(74) *Attorney, Agent, or Firm* — Cantor Colburn LLP (57) ABSTRACT

A solenoid valve comprising a valve portion and a solenoid portion. The valve portion has a pin, the pin having a groove. The solenoid portion has an aperture configured to receive the pin. A resilient locking device is located in the aperture, the resilient locking device configured to engage the groove when the pin has been inserted into the aperture to releasably hold the pin in the aperture. There is also a movable cap having a first and second position wherein, in the first position the movable cap does not abut the resilient locking device and wherein, in the second position, the movable cap abuts the resilient locking device so as to prevent movement of the resilient locking device out of the groove. A method of locking a valve portion to a solenoid portion of a solenoid valve is also disclosed.

6 Claims, 4 Drawing Sheets

(56) References Cited

U.S. PATENT DOCUMENTS

| | | | |
|---|---|---|---|
| 8,334,742 B2 * | 12/2012 | Irwin | ................. H01F 7/088 |
| | | | 335/277 |
| 9,046,188 B2 | 6/2015 | Frippiat et al. | |
| 9,297,475 B2 * | 3/2016 | Nobili | ................. F16K 21/06 |
| 9,518,663 B2 | 12/2016 | Shiota et al. | |
| 9,523,441 B2 | 12/2016 | Abe et al. | |
| 9,664,300 B2 | 5/2017 | Zeiner | |
| 9,683,665 B2 | 6/2017 | Harada et al. | |
| 9,939,082 B2 | 4/2018 | Kunz | |
| 9,982,797 B2 | 5/2018 | Ye et al. | |
| 10,006,560 B2 | 6/2018 | Kanai | |
| 2006/0037652 A1 | 2/2006 | Hall et al. | |
| 2009/0050829 A1 | 2/2009 | Haynes et al. | |
| 2012/0168657 A1 | 7/2012 | Hentschel et al. | |

FOREIGN PATENT DOCUMENTS

| | | |
|---|---|---|
| CN | 207145734 U | 3/2018 |
| DE | 102017200550 A1 | 7/2018 |
| IT | UA20161659 A1 | 8/2017 |
| JP | S5913173 A | 1/1984 |

\* cited by examiner

SOLENOID VALVE LOCK

FOREIGN PRIORITY

This application claims priority to European Patent Application No. 19305588.6, filed May 9, 2019, and all the benefits accruing therefrom under 35 U.S.C. § 119, the contents of which in its entirety are herein incorporated by reference.

BACKGROUND

The present disclosure relates to a solenoid valve and a method for making a solenoid valve.

Solenoid valves are commonly used in fluid flow applications such as refrigeration circuits. Solenoid valves typically contain a solenoid portion that contains a coil of wire, and a valve portion that is connected to the solenoid portion. A pin part of the valve portion extends inside the coil of wire. Controlling the magnetic field generated by passing a current though the coil allows control of the valve portion. Often the valve portion is fluidly isolated from the solenoid portion. The magnetic field from the solenoid penetrates into the pin part and is used to move internal parts within the pin, wherein said parts are for controlling fluid flow through the valve portion. In one known solenoid valve, described in detail below, the pin part is held in the solenoid portion by a resilient locking device that releasably holds the pin. The solenoid portion and valve portion must be pulled apart with some force (in one example, 120N of force) to release the grip of the resilient locking device upon the pin and thereby separate the two portions.

One such solenoid valve is called the "Fast Lock Coil" manufactured by Castel. Other solenoid valves (with different locking mechanisms for holding the parts together) are disclosed in U.S. Pat. Nos. 5,895,026 and 9,982,797.

Refrigeration circuits, particularly refrigeration circuits installed on vehicles, may often be subject to vibrations. For example, the refrigeration unit of a refrigerated truck will be subject to vibrations generated while driving along a road. Sudden bumps (e.g. from hitting a pothole or a rock) may provide sufficient force to pull the solenoid portion apart from the valve portion of a solenoid valve. This could potentially not damage either part, but still cause the solenoid valve to cease functioning properly if the pin is thus improperly positioned with respect to the solenoid's magnetic field, such that the solenoid no longer properly controls the internal parts of the valve portion.

SUMMARY

According to a first aspect, the present disclosure provides a solenoid valve comprising: a valve portion having a pin, the pin having a groove; a solenoid portion having an aperture configured to receive the pin; and a resilient locking device in the aperture, the resilient locking device configured to engage the groove when the pin has been inserted into the aperture to releasably hold the pin in the aperture; and characterised by a movable cap having a first and second position wherein, in the first position the movable cap does not abut the resilient locking device and wherein, in the second position, the movable cap abuts the resilient locking device so as to prevent movement of the resilient locking device out of the groove.

The movable cap may ensure that the resilient locking device cannot lose its grip on the groove of the pin. Thus, the solenoid valve may be more resistant to the valve portion and solenoid portion coming apart, e.g. due to vibrations or shocks.

As is known in the art, the solenoid portion may contain a solenoid coil. A magnetic field generated by the solenoid coil may move one or more parts of the valve portion that are located inside the pin, wherein movement of said part(s) controls fluid flow through the valve portion. Various different arrangements of parts internal to the pin are known in the art.

The resilient locking device may be a spring wire forming a whole or partial annulus. The spring wire may be forced to expand around a portion of the pin before coming into alignment with the groove and, due to the resiliency of the spring wire, it springs into the groove and thereby locks the pin in position. Spring wire may be cheap and simple to install in the aperture.

The aperture may have a first section and a second section, wherein the first section has a first diameter and extends from an outer surface of the solenoid portion; and wherein the second section is located at an end of the first section away from the outer surface, wherein the second section has a second diameter, larger than the first diameter; and the resilient locking device may be located in the second section.

The second section may thus provide a cavity for containing the resilient locking device.

The resilient locking device may have an annular shape that extends between an inner surface and an outer surface, wherein the inner surface has a diameter smaller than the first diameter, and wherein the outer surface has a diameter larger than the first diameter and smaller than the second diameter, such that a radially extending gap is formed between the outer surface of the resilient locking device and a radially outermost surface of the second portion.

When the outer surface of the resilient locking device has a diameter greater than the diameter of the first portion, the resilient locking device cannot easily fall out of the aperture. The radially extending gap provides space for the resilient locking device to expand into when the pin is being inserted through the resilient locking device.

The movable cap may comprise at least one leg, wherein when the movable cap is in the second position, the at least one leg at least partially fills the radially extending gap.

Thus, the leg may prevent the radially-outward movement of the resilient locking device that is required for the resilient locking device to disengage from the groove.

A third section of the aperture may be defined adjacent the second section, opposite the first section, the third section having a third diameter that is smaller than the second diameter. That is, this third section is defined beyond the second section, outward from the first section in the direction extending away from the solenoid portion. Having a smaller diameter for the third section may assist in keeping the resilient locking device correctly located in the second section.

A radially-inwardly facing screw thread may be defined in the aperture and a corresponding screw thread may be defined in a radially-outwardly facing surface of the or each leg, such that the movable cap may be screwed into the solenoid portion to move the movable cap from the first position to the second position.

This provides a mechanism for securing the movable cap in the second position. While the second cap remains in the second position, the resilient locking device cannot disengage from the groove and thus the valve portion and solenoid portion cannot be separated from one another.

In addition, or alternatively, the movable cap may comprise a plurality of legs, wherein each leg is a resilient leg having a radially-outwardly extending flange; wherein the resilient legs are positioned on the movable cap such that a diameter defined by the radially outward most extent of the flanges is greater than the third diameter.

In this example, the resilient legs must bend inwards to get past the third section and into the second section.

The third section may define an annular lip at an end of the second section, wherein in the second position, the flanges engage with the lip to inhibit movement of the movable cap away from the second position.

This provides another mechanism for securing the cap in the second position. The flanges on the legs prevent the movable cap, once installed in the second position, from being easily moved back to the first position. In some examples, the movable cap can be removed using sufficient force (e.g. by levering the cap off with a screwdriver or other tool). Further, depending on the design (e.g. the material used, the resiliency of the legs etc.), this may involve breaking the movable cap or may leave the movable cap intact.

The movable cap may be made of plastic or metal or any suitable material.

Alternatively or additionally, one or more axially extending grooves may be formed in the third section, said grooves configured to receive the or each flange in a first orientation of the movable cap such that the movable cap may move from the first position to the section position; and wherein, in the second position, the movable cap may be rotated away from the first orientation such that the one or more flanges are not aligned with the one or more grooves.

In this example, the movable cap is held in a first orientation where the flanges are aligned with the axially extending grooves and the cap is slid from the first position to the second position. The cap is then turned so that the flanges sit underneath the lip and are not aligned with the grooves. Thus, the moveable cap may be held by a mechanism including a bayonet fit type arrangement. As such, the cap cannot be removed from the second position without first realigning the flanges with the axially extending grooves.

In another aspect, there is provided a method of connecting a valve portion of a solenoid valve to a solenoid portion of the solenoid valve, the method comprising: inserting a pin of the valve portion into an aperture of the solenoid portion, wherein the pin has a groove formed therein; engaging the groove of the pin with a resilient locking device located in the aperture to inhibit movement of the pin out of the solenoid portion; and moving a movable cap from a first position to a second position in the solenoid portion, wherein, in the second position, the movable cap abuts the resilient locking device so as to prevent movement of the resilient locking device out of the groove.

This method means that the valve portion cannot be separated from the solenoid portion while the movable cap is at the second position. This may make the solenoid valve more resistant to shocks and vibrations that would otherwise lead to the valve and solenoid portions disconnecting from each other.

In the step of moving the movable cap from the first position to the second position, the resilient legs of the movable cap may be deformed elastically inwardly until the legs pass a lip in the aperture, at which point, the legs return to an unstressed position abutting the resilient locking device and a flange of each of the resilient legs is located underneath the lip.

The resilient legs may allow the movable cap to easily moved from the first position to the second position, but make it difficult to move the cap back from the second position.

Alternatively or additionally the movable cap may have a screw thread and a section of the aperture may have a corresponding screw thread; wherein, in the step of moving the movable cap from the first position to the second position, the movable cap may be screwed into the aperture to secure the movable cap at the second position.

This provides an alternative or additional feature by which the movable cap is moved into and secured at the second position.

The movable cap may comprise one or more legs each having a radially extending flange, and the aperture may comprise one or more corresponding axially extending grooves; and wherein in the step of moving the movable cap from the first position to the second position, the flanges may slide along the axially extending grooves and, once in the second position, the movable cap may be rotated such that the flanges are not aligned with the axially extending grooves.

This places the flanges out of alignment with the grooves such that the movable cap cannot be removed from the second position without first rotating the movable cap to a position where the flanges are aligned with the axially extending grooves. This provides another mechanism by which the movable cap may be secured at the second position.

DRAWING DESCRIPTION

Certain embodiments of the present disclosure will now be described in greater detail by way of example only and with reference to the accompanying drawings in which.

DETAILED DESCRIPTION

Figure 1:
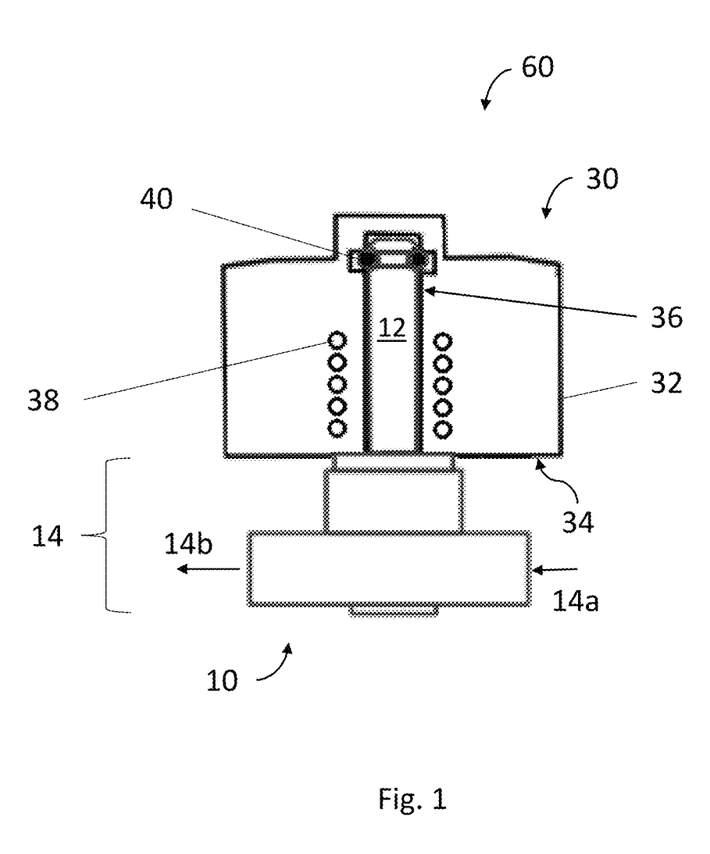
FIG. 1 shows a known solenoid valve comprising a valve portion and a solenoid portion.

FIG. 1 shows a known solenoid valve 60 that comprises two main parts: a valve portion 10 and a solenoid portion 30. This known solenoid valve 60 will be described in detail first, followed by a description of the solenoid valve 100 according to the present disclosure.

The valve portion 10 comprises a valve body 14 and a pin 12 extending away from the valve body 14. The valve body 14 and pin 12 contain internal movable parts (not shown) that control fluid flow through the valve portion 10. Many different designs of valve portions having a pin are known in the art and the specific details of the internal movable parts are beyond the scope of the present disclosure.

The valve body 14 may have an inlet 14a and an outlet 14b, and the solenoid valve 60 may control fluid flow between the inlet 14a and the outlet 14b. The valve portion 10 is typically fluidly isolated from the solenoid portion 30.

The solenoid portion 30 comprises a housing 32 having a first outer surface 34. An aperture 36 is formed in the first surface 34 and the aperture 36 extends from the first surface 34 into the solenoid portion 30. The aperture 34 is for receiving the pin 12 of the valve portion 10, when the valve portion 10 and solenoid portion 30 are connected together. When the solenoid portion 30 and the valve portion 10 are connected together, the valve body 14 abuts the first outer surface 34 of the housing 32. Inside the housing 32, there is a solenoid coil 38 that coils around a portion of the aperture 34. Electrical current in the solenoid coil 38 generates a magnetic field and this magnetic field is for moving one of the aforesaid movable parts inside the pin 12. Thus, controlling the electrical current applied to the solenoid coil 38 allows for controls of fluid flow through the valve portion 10 of the solenoid valve 60. As described in detail below, a releasable locking device 40 holds the pin 12 in the aperture 34 so that the valve portion 10 is held relative to the solenoid portion 30.

Figure 2:
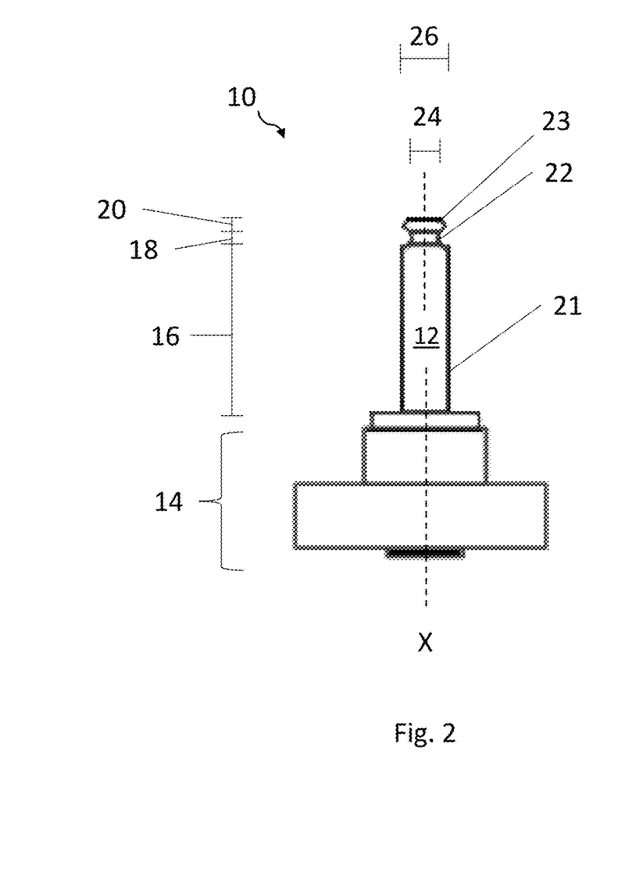
FIG. 2 shows the valve portion of the known solenoid valve.
Figure 3:
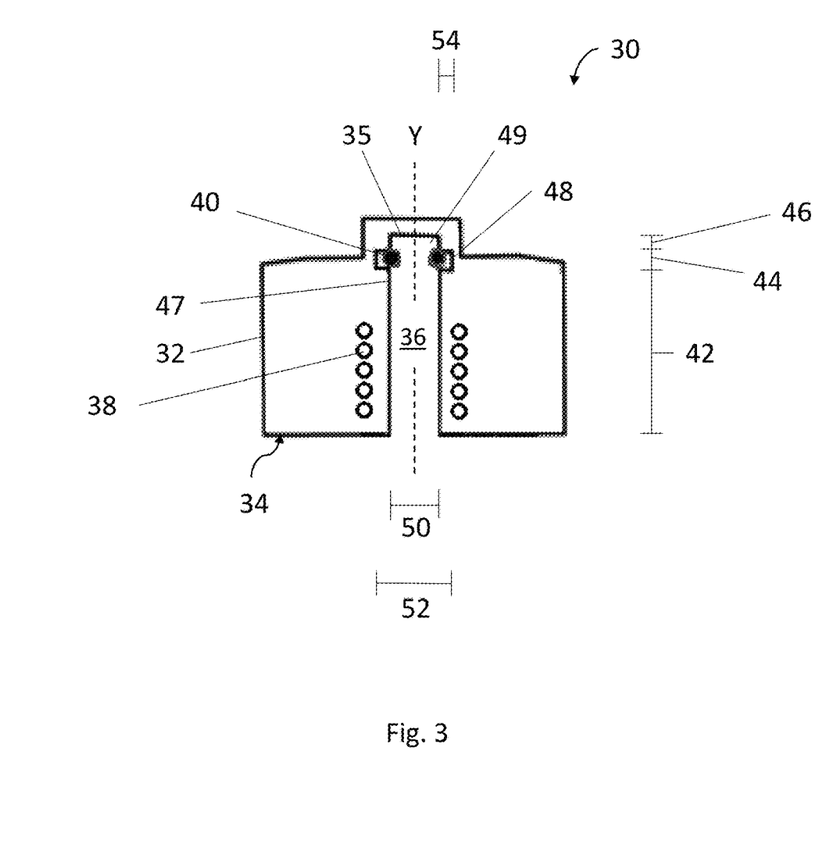
FIG. 3 shows the solenoid of the known solenoid valve.

FIG. 2 shows the valve portion 10 separated from the solenoid portion (which is shown in FIG. 3). The pin 12 extends along an axis X away from the valve body 14, and the pin 12 comprises three portions 21,22,23. The first portion 21 connects to the valve body 14 and extends along the axis X by a first length 16. The second portion is a groove 22 in the surface of the pin 12. The groove 22 is formed at an end of the first portion 21 away from the valve body 14. The groove extends along the axis X by a second length 18. The third portion 23 of the pin 12 is formed at an axial end of the groove 16 away from the first portion 21 and extends along the axis X by a third length 20.

The first portion 21 has a first diameter 26. The second portion, i.e. the groove 22, has a second, smaller diameter 24. The third portion 23 has an outermost diameter larger than the second diameter 22, for example, the third portion 23 may have an outermost diameter equal to the first diameter 26.

In some examples, the groove 16 extends circumferentially all the way around the pin 12. Alternatively, one or more grooves 16 may be formed by removing one or more chunks out of the pin 12, wherein the resilient locking device 40 can engage with the groove or grooves. It is sufficient that the groove 16 defines a portion of the pin 12 having a smaller cross-sectional area than the third portion 23, such that when the third portion 23 has passed resilient locking device 40, the resilient locking device 40 engages the groove 16 and resists movement of the third portion 23 back through the resilient locking device 40.

FIG. 3 shows the solenoid portion 30 separated from the valve portion (which is shown in FIG. 2). The aperture 36 extends, along an axis Y, inwards from the first outer surface 34 and comprises three sections 47,48,49. The first section 47 extends inward starting from the first outer surface 34 and extends a first length 42 along the axis Y. The first length 42 of the first section 47 is approximately the same as the length 16 of the first portion 21 of the pin 12. The first portion 47 has a first diameter 50 that is slightly larger than the first diameter 26 of the pin 12, so that the pin may be accommodated in the aperture 36.

The second section 48 of the aperture 36 is formed at an end of the first section 47 away from the first surface 34. The second section 48 has a second diameter 52 that is larger than the first diameter 50 of the aperture 34. The length 44 of the second section is approximately the same as the length of the groove 22 (i.e. second portion) of the pin 12. The second section extends a second length 44 along the axis Y.

The third section 49 is formed at an end of the second section 48 away from the first section 47. The third section 49 extends a third length 46 along the axis Y and terminates at an end 35 of the aperture 36 within the solenoid portion 30. The third section 49 has a diameter smaller than the diameter 50 of the second section 48, for example, the third section 49 may have the same diameter 50 as the first section 47.

The solenoid coil 38 is coiled around the axis Y and is coiled around the first section 47 of the aperture 34 along at least some of the length 42 of the first section 47.

The resilient locking device 40 is located in the second section 48 of the aperture 36. For example, the resilient locking device 40 may be a spring wire formed in a generally annular shape. An annulus has an inner diameter and an outer diameter. The inner diameter of the wire spring is smaller than the first diameter 50 and the outer diameter is greater than the first diameter 50, such that the spring wire sits in the second section 48 and does not fall out through the first portion 47 of the aperture 36. The outer diameter of the resilient locking device 40 is smaller than the diameter 52 of the second section 48, such that there is a radial gap 54 (radial relative to the axis Y) defined between the outer surface of the resilient locking device 40 and the radially outer surface of the second section 48.

The sum of the lengths 16,18,20 of the portions 21,22,23 of the pin 12 is approximately equal to the sum of the lengths 42,44,46 of the sections 47,48,49 of the aperture 36. Thus, when the pin 12 is fully inserted into the aperture 36, such that the valve body 14 abuts the first surface 34, an end of the pin abuts or nearly abuts the end 35 of the aperture 36.

Figure 4:
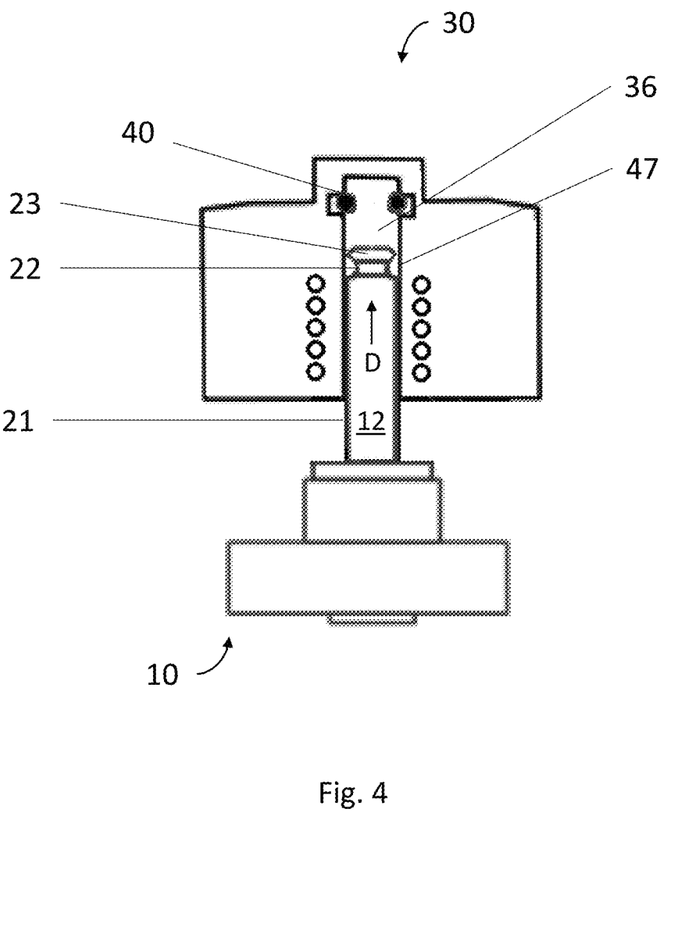
FIG. 4 shows the solenoid valve of FIG. 1 in a different configuration.

FIG. 4 shows the valve portion 10 in the process of being connected to the solenoid portion 30. The pin 12 has entered the aperture 36 and is moving along the direction indicated by arrow D towards the resilient locking device 40. In the position shown in FIG. 4, the third 23 and second 22 portions of the pin 12 are entirely within the first section 47 of the aperture 36 and the first portion 21 of the pin 12 is partially within the aperture 36.

As the valve portion 10 moves further in direction D, the third portion 23 of the pin 12 eventually contacts the resilient locking device 40. At this point, the third portion 23 forces the inner diameter (and outer diameter) of the resilient locking device 40 to expand radially outwards to accommodate the diameter of the third portion 23. During this, the radial gap 54 (between the outer surface of the resilient locking device 40 and the radially outermost surface of the second section 48) shrinks slightly but the gap 54 is not necessarily eliminated entirely. As the third portion 23 moves past the resilient locking device (i.e. along axes X,Y), the groove 22 is brought into axial alignment with the resilient locking device 40. Due to the resilience of the resilient locking device 40, the resilient locking device 40 springs into the groove 40 to grip the pin 12. This is the connected arrangement shown in FIG. 1. In this manner, the valve portion 10 may not be easily removed from the solenoid portion 30 because the resilient locking device 40 resists the outward expansion needed to accommodate movement of the third portion 23 of the pin 12 back through the device 40. However, with sufficient force, the pin 12 may be removed from the grip of the resilient locking device 40 without damage to either portion 10,30 of the solenoid valve 60. In some known solenoid valves, a force of about 120N (i.e. about 12 kg load along axis X,Y) is required to separate the valve portion 10 from the solenoid portion 30 when the resilient locking device 40 is gripping the pin 12.

Figure 5:
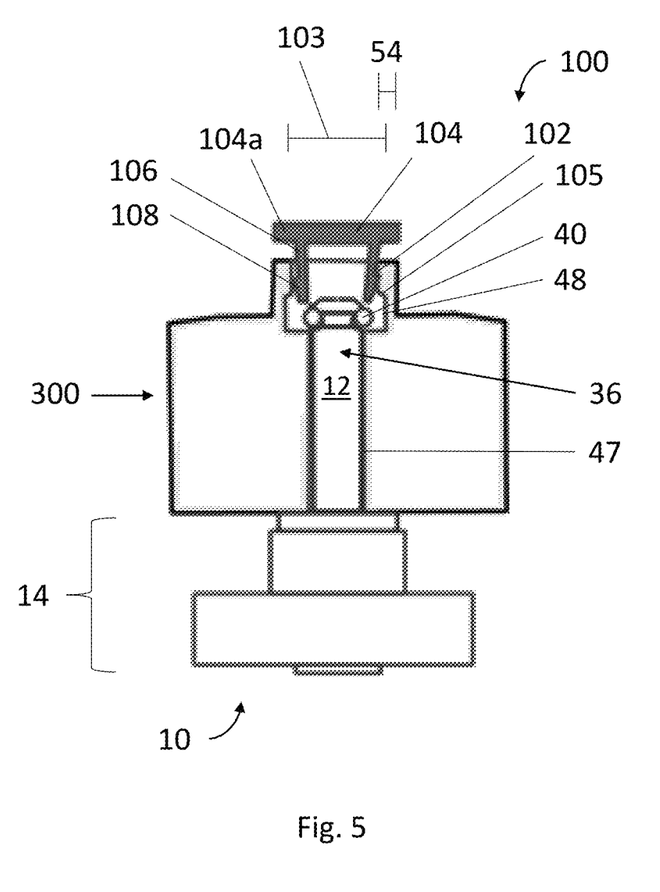
FIG. 5 shows a solenoid valve according to the present disclosure.
Figure 6:
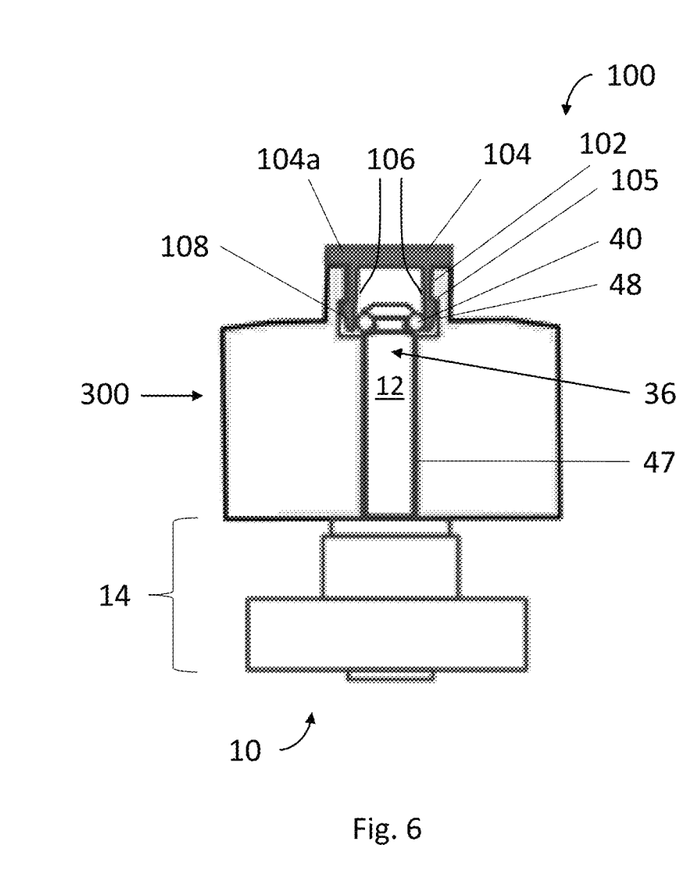
FIG. 6 shows another view of the solenoid valve according to the present disclosure.

FIGS. 5 and 6 show a solenoid valve 100 according to the present disclosure. A number of parts are the same in the known solenoid valve 60 and the solenoid valve 100 according to the present disclosure, and so like numbers will be used for like parts.

Similar to the known solenoid valve 60, the solenoid valve 100 according to the present disclosure comprises a valve portion 10 having a valve body 14 and a pin 12. The pin 12 is received in an aperture 36 having first 47 and second 48 sections. A resilient locking device 40 is disposed in the second section 48 and the resilient locking device 40 grips the pin 12 in the same manner as disclosed above.

The solenoid portion 300 of the solenoid valve 100 according to the present disclosure has a first section 47 and second section 48 similar to the known arrangement of FIGS. 1 to 4, but it includes a modified third section 102 compared to the known solenoid valve 60. The solenoid coil 38 is also present in the solenoid valve 100 according to the present disclosure but is omitted from FIGS. 4 and 5 for clarity.

The aperture 36 of the solenoid portion 300 extends entirely through the solenoid portion 300 and a movable cap 104 (which may be formed entirely separately from the solenoid portion 300) is used to enclose an end of the aperture 36. In the solenoid valve 100 according to the present disclosure, the pin 12 is inserted into the aperture 36 in the same manner as described above for the known solenoid valve 60. When the pin 12 is first being fully inserted into the aperture 36 (i.e. so that the valve body 14 abuts the first surface 34 and the resilient locking device 40 grips into the groove 22 of the pin 12), the movable cap 104 is in a first position (shown in FIG. 4) spaced away from the resilient locking device 40. In this first position, the movable cap 104 does not interfere with any aspect of the pin 12 being inserted into the aperture 36 and then being releasably locked in place by the resilient locking device 40.

The first position may be a position in which the movable cap 104 is totally separate from the solenoid portion 100. Alternatively, as shown in FIG. 5, the first position may be a position in which the movable cap 104 is partially inserted into the solenoid portion 100 but where the resilient legs do not interfere with the resilient locking device 40.

The third section 102 of the aperture 36 has a diameter 103 that is smaller than the diameter 52 of the second section 48. In this way, the third portion 102 provides an annular lip 105 at the end of the second section 48.

The movable cap 104 has two or more resilient legs 106, as depicted in FIGS. 4 and 5. Once the resilient locking device 40 is gripping the groove 16 of the pin 12, the movable cap 104 may be moved to a second position (shown in FIG. 5) in which the legs 106 fill most of the radial gap 54 between the outer surface of the resilient locking device 40 and the radially outer surface of the second section 48. The one or more resilient legs 106 thereby stop the outward expansion of the resilient locking device 40 (e.g. over the diameter of the third portion 23 of the pin 12) that would be necessary for the pin 12 to be removed from the solenoid portion 300. In this manner, the movable cap 104, in the second position, locks the pin 12 into the solenoid portion 300 more strongly than in the known solenoid valve 60 described previously. That is, a significantly larger force is required to pull the pin 12 out of the aperture 36 and thereby to separate the valve portion 10 from the solenoid portion 300 when the movable cap 104 in the second position. Indeed, the force required may be so great that the valve portion 10 and/or solenoid portion 300 would be damaged by forceful removal of the pin 12 from the aperture 36.

The movable cap 104 may be moved to the second position by a user (e.g. technician) pressing on the base 104a of the movable cap 104.

The resilient legs 106 do not need to fill the entire radial gap 54, but only need to fill enough of the gap 54 such that the resilient locking device 40 cannot expand radially outwards enough for it to accommodate the third portion 23 of the pin 12 moving therethrough.

As shown in FIGS. 4 and 5, each of the resilient legs 106 extends away from a base 104a of the movable cap 104. Each of the resilient legs 106 has a radially extending flange 108 at a point spaced apart from the base 104a. The movable cap 104 is designed such that the radially outermost extent of the flanges 108 of the resilient legs 106 are slightly farther apart than the diameter 103 of the third portion 102 (i.e. a circle drawn to connect the flanges has a diameter greater than the diameter 103 of the third portion 102). Thus, as shown in FIG. 4, when the movable cap 104 is in the first position (i.e. is being inserted into the solenoid portion 300), the resilient legs 106 are elastically deformed radially inwards by the flanges 108 pressing against the outer diameter 103 of the third portion 102. Then, as shown in FIG. 5, when the movable cap 104 has moved to the second position, the flanges 108 have passed from the third portion 102 and into the larger diameter 52 of the second portion 48. The resilient legs 106 have therefore elastically sprung back to their unstressed position and the flanges 108 sit underneath the annular lip 105. The annular lip 105 stops the resilient legs 106 (and thus the movable cap) from moving back out of the second position.

When the movable cap 104 is in the second position, as shown in FIG. 5, the resilient legs 106 fill the radial gap 54 between the outer surface of the resilient locking member 40 and the radially outermost surface of the second section 48 of the aperture 36.

Other possible mechanisms (not shown) for the movable cap 104 are envisaged. These may be used in combination or separately. In one such mechanism, the third section 102 may have one or more axially extending grooves (i.e. along axes coaxial with axis Y of the aperture 36) that can accommodate the flanges 108 on the legs 106 of the movable cap 104. The movable cap 104 is then positioned such that each flange 108 slides along a respective axial groove as the movable cap 104 moves from the first position to the second position. The movable cap 104 may then be rotated about the axis Y of the aperture 36, such that the flanges 108 are not aligned with the axial grooves. As such, the flanges 108 are then positioned underneath the lip 105 and the movable cap cannot be moved back out of the second position unless the movable cap is first rotated back to a position where the flanges 108 and axial grooves are aligned.

In another possible mechanism (not shown), the flanges 108 may be replaced by a radially-outward facing screw thread, and a corresponding radially-inwardly facing screw thread may be formed on the third portion 102. The movable cap 104 may then be screwed into the third portion, coming to rest at the second position where the resilient leg(s) fill the radial gap 54. In this example, the movable cap 104 may optionally have only a single "leg" defining an annulus or part of an annulus. Further, this "leg" does not need to be resilient as it is not required to be deformed inwardly by the third portion when moving from the first to the second position (i.e. when being screwed in to the third portion).

What is claimed is:

1. A solenoid valve (100) comprising:
   a valve portion (10) having a pin (12), the pin having a groove (16);

a solenoid portion (300) comprising a housing having an aperture (36) configured to receive the pin; and a resilient locking device (40) located inside the housing and in the aperture, the resilient locking device configured to engage the groove when the pin has been inserted into the aperture to releasably hold the pin in the aperture; and a movable cap (104) having a first and second position wherein, in the first position the movable cap does not abut the resilient locking device and wherein, in the second position, the movable cap abuts the resilient locking device so as to prevent movement of the resilient locking device out of the groove;

wherein the aperture has a first section (47) and a second section (48), wherein the first section has a first diameter (50) and extends from an outer surface (34) of the solenoid portion; and wherein the second section is located at an end of the first section away from the outer surface, wherein the second section has a second diameter (52), larger than the first diameter; and wherein the resilient locking device is located in the second section;

wherein a third section (102) of the aperture is defined adjacent the second section (48), opposite the first section (47), the third section having a third diameter (103) that is smaller than the second diameter (52);

wherein the movable cap comprises a plurality of legs (106), wherein each of the plurality of legs is a resilient leg having a radially-outwardly extending flange (108); wherein the resilient legs are positioned on the movable cap such that a diameter defined by the radially outwardmost extent of the radially-outwardly extending flanges is greater than the third diameter (103).

2. The solenoid valve of claim 1, wherein the resilient locking device (40) is a spring wire forming a whole or partial annulus.

3. The solenoid valve of claim 1 wherein the resilient locking device has an annular shape that extends between an inner surface and an outer surface, wherein the inner surface has a diameter smaller than the first diameter (50), and wherein the outer surface has a diameter larger than the first diameter (50) and smaller than the second diameter (52), such that a radially extending gap (54) is formed between the outer surface of the resilient locking device and a radially outermost surface of the second section.

4. The solenoid valve according to claim 3 wherein the movable cap comprises at least one leg (106), wherein when the movable cap is in the second position, the at least one leg at least partially fills the radially extending gap (54).

5. The solenoid valve according to claim 1, wherein the third section defines an annular lip (105) at an end of the second section, wherein in the second position, the flanges engage with the annular lip to inhibit movement of the movable cap away from the second position.

6. A method of connecting a valve portion (10) of a solenoid valve (100) to a solenoid portion (300) of the solenoid valve, the solenoid portion having a housing, the method comprising:

inserting a pin (12) of the valve portion into an aperture (36) of the housing of the solenoid portion, wherein the pin has a groove (16) formed therein;

engaging the groove of the pin with a resilient locking device (40) located inside the housing and in the aperture to inhibit movement of the pin out of the solenoid portion; and moving a movable cap (104) from a first position to a second position in the solenoid portion, wherein, in the second position, the movable cap abuts the resilient locking device so as to prevent movement of the resilient locking device out of the groove;

wherein in the step of moving the movable cap from the first position to the second position, resilient legs (106) of the movable cap are deformed elastically inwardly until the legs pass a lip (105) in the aperture, at which point, the resilient legs return to an unstressed position abutting the resilient locking device and a flange (108) of each of the resilient legs is located underneath the lip.

* * * * *